United States Patent
Cordonnier et al.

(10) Patent No.: US 8,647,430 B2
(45) Date of Patent: *Feb. 11, 2014

(54) PROCESS FOR MANUFACTURING CEMENT CLINKER IN A PLANT, AND CEMENT CLINKER MANUFACTURING PLANT AS SUCH

(75) Inventors: Alain Cordonnier, Villeneuve d'Ascq (FR); Sébastien Devroe, Bouvines (FR)

(73) Assignee: Fives FCB, Villeneuve d'Ascq (FR)

( * ) Notice: Subject to any disclaimer, the term of this patent is extended or adjusted under 35 U.S.C. 154(b) by 293 days.

This patent is subject to a terminal disclaimer.

(21) Appl. No.: 13/003,821

(22) PCT Filed: Jul. 17, 2009

(86) PCT No.: PCT/FR2009/000883
§ 371 (c)(1),
(2), (4) Date: Jan. 12, 2011

(87) PCT Pub. No.: WO2010/012880
PCT Pub. Date: Feb. 4, 2010

(65) Prior Publication Data
US 2011/0113988 A1    May 19, 2011

(30) Foreign Application Priority Data
Aug. 1, 2008   (FR) .................................. 08 04406

(51) Int. Cl.
| | |
|---|---|
| C04B 7/38 | (2006.01) |
| F27B 15/00 | (2006.01) |
| F27B 7/00 | (2006.01) |
| F27B 7/36 | (2006.01) |
| F27B 7/06 | (2006.01) |
| F23B 70/00 | (2006.01) |
| F23B 80/02 | (2006.01) |
| F23C 9/00 | (2006.01) |
| A47J 36/00 | (2006.01) |
| A47J 36/24 | (2006.01) |
| F27B 7/32 | (2006.01) |
| F27B 9/04 | (2006.01) |
| F27B 3/22 | (2006.01) |
| F27D 7/04 | (2006.01) |

(52) U.S. Cl.
USPC ............... 106/771; 432/14; 432/58; 432/103; 432/105; 432/113; 432/117; 432/152; 432/176; 432/199; 110/204; 110/246

(58) Field of Classification Search
USPC ........ 431/2; 432/14, 105, 113, 117, 103, 152, 432/176, 199, 58; 266/173; 106/816; 110/246

See application file for complete search history.

(56) References Cited

U.S. PATENT DOCUMENTS

| | | |
|---|---|---|
| 8,187,374 B2 | 5/2012 | Penfornis et al. |
| 2007/0248925 A1 | 10/2007 | Dupois |

FOREIGN PATENT DOCUMENTS

EP          1923367 A       5/2008

(Continued)

OTHER PUBLICATIONS

Barker et al., "CO2 Capture in the Cement Industry", IEA Greenhouse Gas R&D, Technical Study, Report No. 2008/3, Jul. 2008.

(Continued)

Primary Examiner — Kaj K Olsen
Assistant Examiner — Karam Hijji
(74) Attorney, Agent, or Firm — Young & Thompson

(57) ABSTRACT

The invention relates to a process for manufacturing cement clinker in a plant having a cyclone preheater, a precalcination reactor, a rotary furnace and a clinker cooler. In the process, the flue gases from the furnace are conducted to the precalcination reactor, or even to the cyclone preheater. According to the invention, the precalcination reactor is fed with an oxygen-rich gas, the nitrogen content of which is less than 30%, constituting the sole oxygen source for said reactor, and a portion leaving the cyclone preheater is recycled into the plant so as to obtain a suitable flux necessary for suspending matter in said preheater, while the other portion, rich in carbon dioxide, is adapted for the purpose of a treatment for limiting the amount of carbon dioxide discharged into the atmosphere, such as particularly sequestration.

12 Claims, 3 Drawing Sheets

(56) References Cited

FOREIGN PATENT DOCUMENTS

| | | |
|---|---|---|
| JP | 02263746 A | 10/1990 |
| JP | 09110485 A | 4/1997 |
| WO | 2008056068 A1 | 5/2008 |

OTHER PUBLICATIONS

Zeman et al., "The Zero Emission Kiln", Pollution Control, May 2006, pp. 55-58.
Dixon et al., "IEA Greenhouse Gas R&D Programme Update", CSLF Technical Group, Nov. 16, 2008.
Aiken et al., "GHGT-9—9th International Conference on Greenhouse Gas Control Technologies", Nov. 2008, pp. 1-4.
Barker, Duncan, IEA GHS cement CCS study report, Jul. 29, 2008.

PROCESS FOR MANUFACTURING CEMENT CLINKER IN A PLANT, AND CEMENT CLINKER MANUFACTURING PLANT AS SUCH

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The invention concerns a process for manufacturing a cement clinker in a plant as well as a cement clinker manufacturing plant as such.

2. Description of Related Art

Including Information Disclosed Under 37 CFR 1.97 and 37 CFR 1.98.

The manufacture of cement uses for its greatest part a baked matter, clinker, which is generated from minerals whose essential constituent is calcium carbonate. Clinker is prepared using a baking operation which produces large amounts of carbon dioxide, by the decomposition of calcium carbonate as well as the combustion of the fuel necessary to the operation.

For example, the production of a ton of so-called Portland cement thus emits approx. 530 kg CO2 from the treated matter and 250 to 300 kg CO2 from the fuel. This carbon dioxide is emitted in flue gases, at a concentration lower than 30%, wherein the principal component of the flue gases is nitrogen. Under these conditions, it is difficult to isolate, in particular to sequestrate for the purpose of limiting the discharges of CO2 into the atmosphere.

Manufacturing a cement clinker most often uses a so-called dry baking process, where the previously crushed raw matter is calcinated in a rotary furnace. So as to reduce the energy requirements of the operation, exchangers have been added upstream and downstream of the rotary furnace and directly recover the heat contained in the matter and the flue gases leaving the furnace.

A cyclone preheater is provided upstream where the raw matter is preheated in suspension, and partially decarbonated. A clinker cooler is provided downstream where the baked matter is cooled by cold-air blowing. Most plants operating in so-called dry mode comprise a combustion reactor at the bottom of the preheater, referred to as precalcinator, wherein a significant portion of the fuel consumed by the baking unit is provided, and in which the calcium carbonate contained in the matter in suspension performs a major portion of its decarbonation reaction.

The object of the present invention is to remedy the drawbacks aforementioned while offering an economically viable method for manufacturing a cement clinker for limiting the carbon dioxide discharges into the atmosphere.

Another aim of the invention is to provide such a process which can be implemented in a plant technically close to that normally used for the production of cement clinker.

Another aim of the invention is to provide such a plant.

Other aims and advantages of the present invention will appear in the following description which is given only by way of example and without being limited thereto.

BRIEF SUMMARY OF THE INVENTION

The invention relates first of all to a process for manufacturing cement clinker in a plant comprising a cyclone preheater for preheating the raw matter; a precalcination reactor fitted with one or more burners for bringing heat to the cyclone preheater; a rotary furnace, fitted with a burner fed with fuel, wherein the flue gases from said furnace are conducted to the precalcination reactor and/or the cyclone preheater; a clinker cooler with blown-air cooling, at the exit from said rotary furnace, generating hot gas, a process wherein: the raw matter is preheated and decarbonated in said cyclone preheater and/or said precalcination reactor; the clinker leaving said furnace is cooled in said clinker cooler.

According to the present invention the precalcination reactor is fed with an oxygen-rich gas whose nitrogen content is lower than 30%, forming the single oxygen source of said reactor. A portion of the gases leaving said cyclone preheater is recycled in the plant so as to obtain an adequate flux necessary for suspending matter in said preheater, while the other portion, rich in carbon dioxide, is adapted for the purpose of a treatment for limiting the amount of carbon dioxide discharged into the atmosphere, such as particularly sequestration.

Also disclosed is a plant for manufacturing a cement clinker enabling in particular the implementation of the method, comprising: a cyclone preheater for preheating the raw matter; a precalcination reactor fitted with one or more burners for bringing heat to the cyclone preheater, a rotary furnace, fitted with a burner fed with fuel, wherein the flue gases from said furnace are conducted to the precalcination reactor, possibly said preheater; and a clinker cooler with blown-air cooling, at the exit from said rotary furnace generating hot gas.

According to the present invention, the plant further comprises: a source of an oxygen-rich gas whose nitrogen content is lower than 30%, feeding the precalcination reactor; and a duct for recycling a portion of the gases leaving said cyclone preheater in the plant.

BRIEF DESCRIPTION OF THE SEVERAL VIEWS OF THE DRAWINGS

The invention will be understood better when reading the following description accompanied by the appended drawings among which.

DETAILED DESCRIPTION OF THE INVENTION

Figure 1:
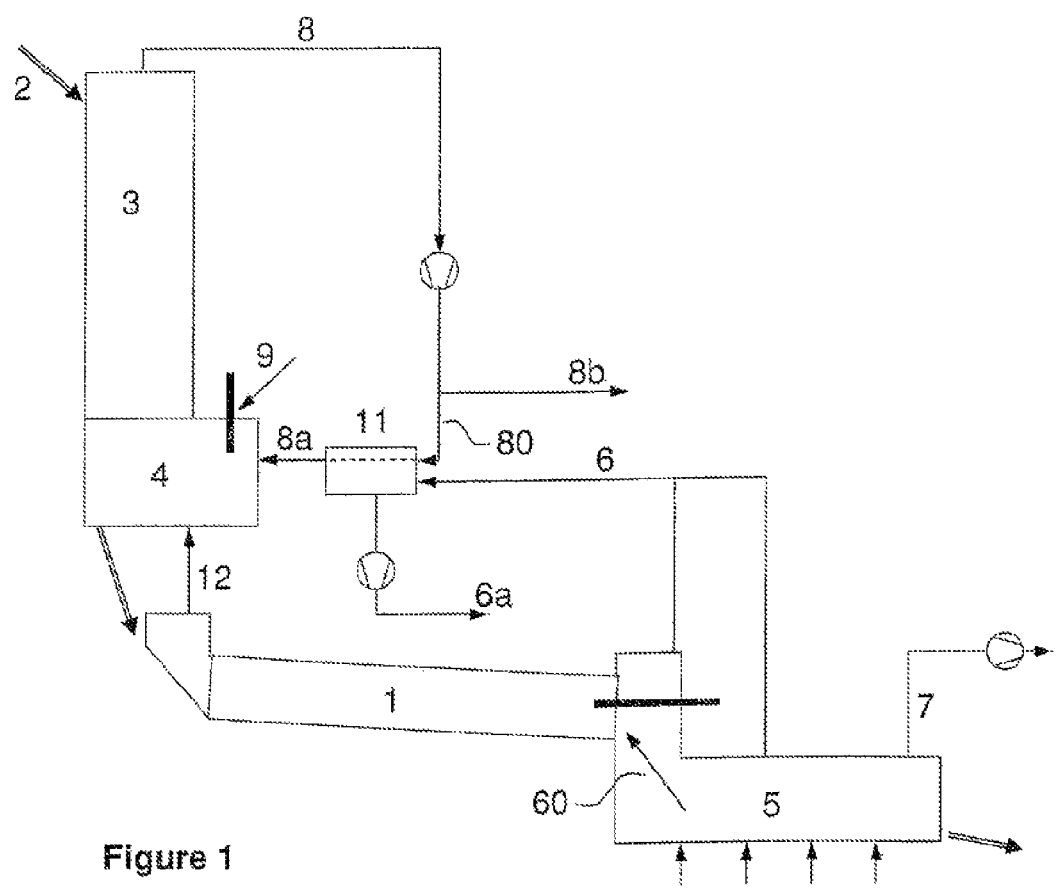
FIG. 1 illustrates diagrammatically an example of the manufacturing process and the related plant, according to the invention in a first embodiment.

The invention also relates to a process for manufacturing cement clinker in a plant. Said plant comprises: a cyclone preheater 3 for preheating the raw matter 2; a precalcination reactor 4 fitted with one or more burners for bringing heat (hot gases) to the cyclone preheater 3; a rotary furnace 1, fitted with a burner fed with fuel, wherein the flue gases from said furnace 1 are conducted to the precalcination reactor 4 and/or the cyclone preheater 3; and a clinker cooler 5 with blown-air cooling, at the exit from said rotary furnace 1 generating hot gas.

It is thus a plant comprising a cyclone preheater, a precalcination reactor, a rotary furnace and a clinker cooler in a manner equivalent to the plants of the prior art.

According to the method of the invention: the raw matter is preheated and decarbonated in said cyclone preheater 3 and/or said precalcination reactor 4; and the clinker leaving the furnace 1 is cooled in said clinker cooler 5.

According to the invention: the precalcination reactor 4 is fed with an oxygen-rich gas 9 whose nitrogen content is lower than 30%, forming the single oxygen source of said reactor 4; a portion 8a of the gases 8 leaving said cyclone preheater 3 is recycled in the plant, so as to obtain an adequate flux necessary for suspending matter in said preheater 3, while the other portion 8b, rich in carbon dioxide, is adapted for the purpose of a treatment for limiting the amount of carbon dioxide discharged into the atmosphere, such as particularly sequestration.

The invention comprises using instead of air for the combustion at the level of the precalcination reactor 4, pure oxygen or at least an oxygenated gas whose nitrogen content is highly reduced relative to that of the air.

The amount of generated flue gases is thus lower than usual and insufficient for maintaining the matter in suspension and thereby securing normal aeraulic operation of the cyclone preheater.

According to the invention, this unbalance is corrected by recycling a sufficient amount of flue gases leaving the preheater for maintaining an adequate gas flow. The gases generated are thus enriched with carbon dioxide and depleted with nitrogen, and thus adapted for the purpose of a treatment for limiting the amount of carbon dioxide discharged into the atmosphere, such as particularly sequestration.

More precisely, according to an embodiment, the portion 8a of the gases 8 leaving said cyclone preheater 3 is recycled so as to obtain a mass flowrate ratio between the treated matter and the flue gases ranging from 0.5 kg/kg to 2 kg/kg.

In an embodiment of the process, particularly illustrated according to the example of FIG. 1, a portion 8a of the gases 8 leaving said cyclone preheater 3 is recycled and reheated before conveying it directly to the precalcination reactor 4, possibly the cyclone preheater 3. For example, the portion 8a of the recycled gases is reheated thanks to a portion 6 of the hot gas generated by the clinker cooler 5.

We shall now describe more particularly in detail the example of FIG. 1.

In this example, the cooling gas of the clinker cooler 5 is air and thus contains a significant portion of nitrogen.

The hot air generated by the clinker cooler 5 is divided into three fluxes. A portion 60 of the hot air generated in said cooler, or so-called secondary air, is directed to the rotary furnace 1 to be used as combustion air in the furnace.

A second portion 6 of the hot gases generated in said clinker cooler, so-called tertiary flux, defined by a temperature at least equal to 750° C. is carried separately from the first portion 60 to said exchanger 11, so as to reheat the portion 8a of the recycled gases.

Finally, a third portion 7, with temperature lower than the temperature of the tertiary flux, is extracted and may be used for the production of mechanical energy, possibly electricity.

Possibly, the residual heat contained in the tertiary flux 6a, downstream of the exchanger 11, may be used for the production of energy, particularly electricity. Possibly, the residual heat contained in the non recycled portion 8b of the flue gases from the preheater is also used for the production of energy.

It should be noted that, in this example, the recycled portion 8a is conducted directly to said precalcination reactor 4, possibly the cyclone preheater 3. When the gases are conducted to the precalcination reactor 4, the combustion gas in the reactor 4 is a mixture of the gas 9, rich in oxygen, and of the recycled portion 8a, rich in carbon dioxide. Advantageously, this mixture prevents the combustion gas from being over-concentrated in oxygen and thus avoids the creation of too strong a flame in the reactor 4 which might damage it.

Possibly, the portion 8b of carbon dioxide rich gas, non directly recycled, may be used at least partially as a pneumatic transport fluid for the solid fuels and/or as a pulverisation fuel for the liquid fuels and/or as a pneumatic cleaning fluid of the cyclone preheater and/or of the clinker cooler.

Figure 2:
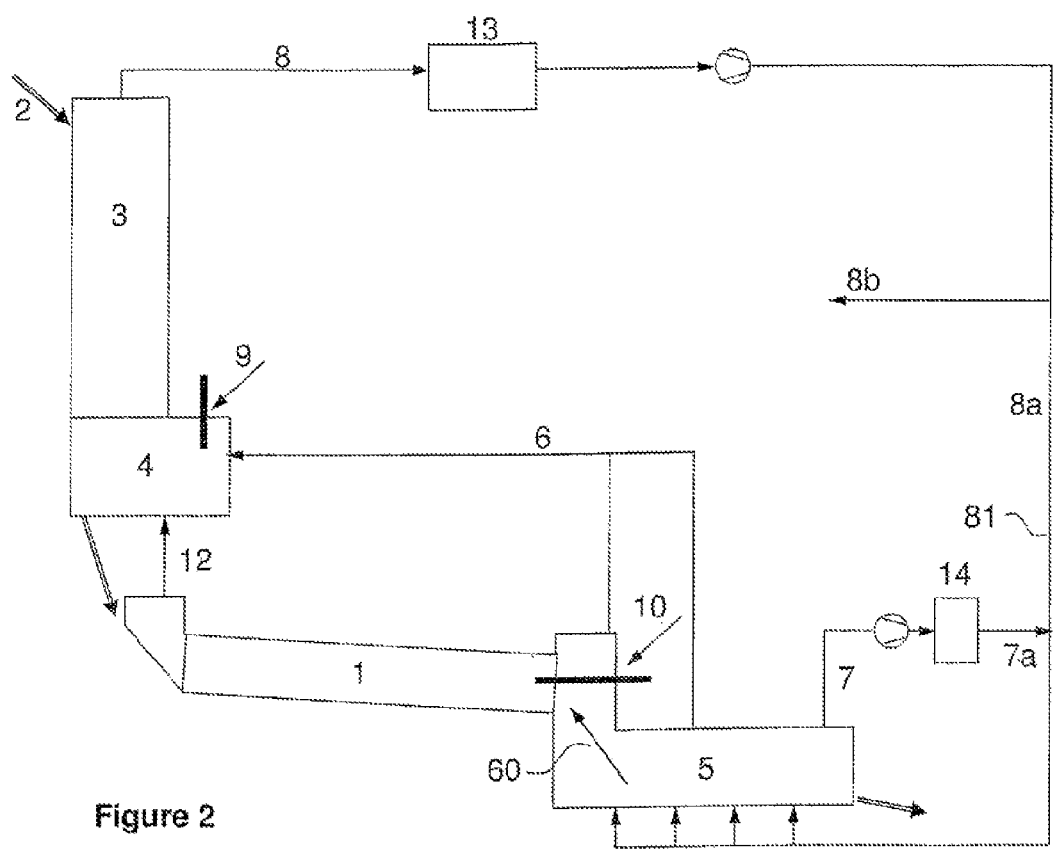
FIG. 2 illustrates a process for manufacturing cement clinker and the related plant, according to the invention in a second embodiment.
Figure 3:
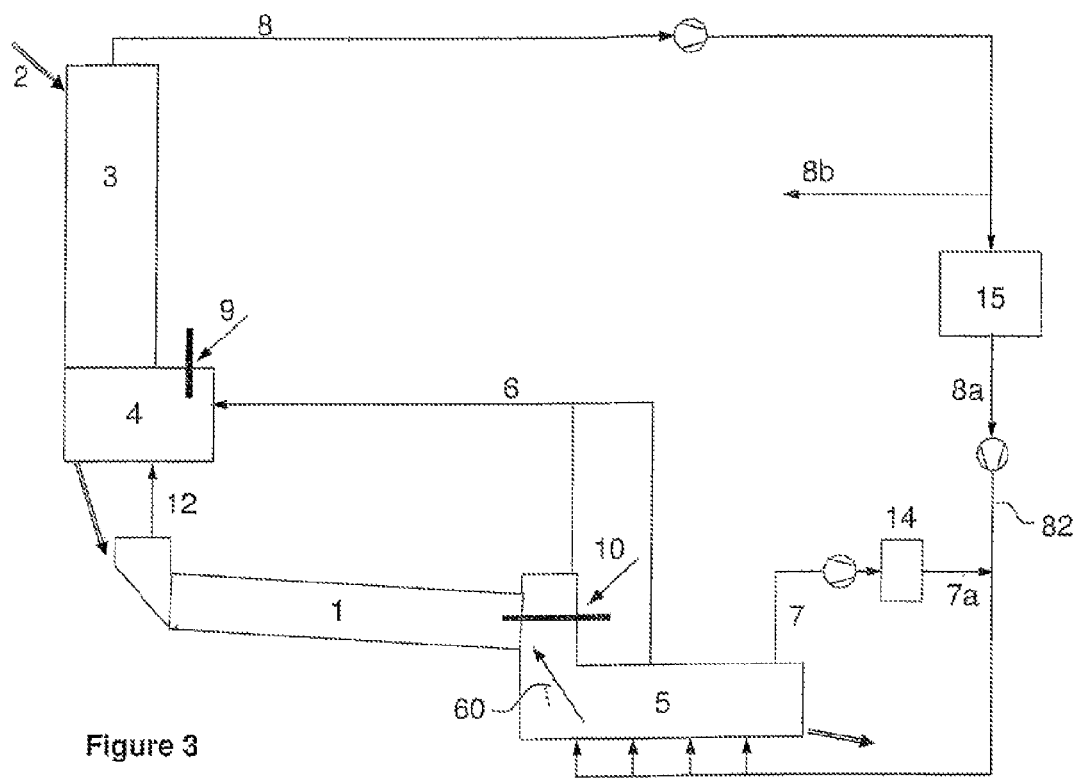
FIG. 3 illustrates a process for manufacturing cement clinker and the related plant, according to the invention in a third embodiment.

According to another embodiment illustrated in particular on FIG. 2 or 3: the burner of the rotary furnace 1 is fed with an oxygen-rich gas 10 whose nitrogen content is lower than 30%, forming the single oxygen source of the furnace; and the portion 8a of the gases leaving the preheater 13 is recycled and cooled through an exchanger 13; 15 and directed to said clinker cooler to act as a cooling gas.

We shall now describe in more detail the process of the invention according to the example of FIG. 2.

In this example, the cooling gas feeding the clinker cooler 5 comes from recycled gases which, for the portion 8a, originate from the gases leaving the preheater 3, and for another, originate from a portion of the hot gases generated by said clinker cooler 5. The burner(s) of the rotary furnace are fed with an oxygen-rich gas 10 whose nitrogen content is lower than 30%, forming the single oxygen source of the furnace. The burner(s) precalcination reactor 4 are fed with an oxygen-rich gas 9 whose nitrogen content is lower than 30%, forming the single oxygen source of the reactor 4.

Also, the cooling gas is rich in carbon dioxide. A portion 60 of the hot gas generated in the clinker cooler 5, also called secondary flux, is directed towards the rotary furnace 1. More precisely, this portion 60 mixes with the oxygen rich gas 10, thereby limiting the oxygen concentration of the combustion gas so that the flame of the furnace burner is not too strong, so as not to damage said furnace.

A second portion 6 of the hot gas, also rich in carbon dioxide, generated in the clinker cooler 5, so-called tertiary flux, defined by a temperature at least equal to 750° C., is conducted separately from the first portion towards the precalcination reactor 4. In this reactor, this portion 6 of carbon dioxide rich gas is mixed with the oxygen-rich gas 9, thereby limiting the oxygen concentration of the combustion gas so that the flame of the reactor burner 4 is not too strong, which might damage it.

A third portion 7 of the hot gas generated in the clinker cooler 5 is cooled down in an exchanger 14 and is recycled for feeding the clinker cooler 5 with cooling gas.

Possibly, the residual heat contained in the non recycled portion 8b of the flue gases from the preheater is also used for the production of energy. Possibly, the portion 8b of carbon dioxide rich gas, non directly recycled, may be used at least partially as a pneumatic transport fluid for the solid fuels and/or as a pulverisation fuel for the liquid fuels and/or as a pneumatic cleaning fluid of the cyclone preheater 3 and/or of the clinker cooler 5.

The plant illustrated on FIG. 3 is substantially similar to that of FIG. 2 and stands out in that the exchanger 15 placed on the stream of the portion 8a of the recycled gases consists of a grinding and drying unit for the raw matter.

In the plants of FIGS. 1, 2 and 3, the oxygen rich gas 9 or 10 may have a nitrogen content of less than 5%.

The invention also refers to a plant for the manufacture of cement clinker as such. Said plant comprises: a cyclone preheater 3 for preheating the raw matter 2; a precalcination reactor 4 fitted with one or more burners for bringing heat to the cyclone preheater 3; a rotary furnace 1, fitted with a burner fed with fuel, wherein the flue gases from said furnace are conducted to the precalcination reactor 4, possibly said preheater 3; a clinker cooler 5 with blown-air cooling, at the exit from said rotary furnace 1 generating hot gas.

According to the invention, the plant moreover includes, at least: a source of an oxygen-rich gas 9 whose nitrogen content is lower than 30%, feeding the precalcination reactor 4; and a duct 80; 81; 82 for recycling a portion 8a of the gases 8 leaving said cyclone preheater 3 in the plant. There may be in particular the plants described previously on FIGS. 1, 2 and 3, which enable the implementation of the method according to the invention.

According to an embodiment, at least one exchanger 11 co-operates with a portion 6 of the hot air generated by the clinker cooler 5 for reheating the portion 8a of the recycled gases, whereas the recycling duct 80 directly feeds the precalcination reactor 4, possibly the cyclone preheater 3.

According to another embodiment illustrated in particular on FIG. 2 or 3: a source of an oxygen-rich gas whose nitrogen content is lower than 30%, feeds the burner of the rotary furnace 1; and at least one exchanger 13; 15 co-operates with the portion 8a of the recycled gases for cooling it, said recycling duct 81; 82 feeding said clinker cooler 5 with cooling gas.

Possibly, according to this embodiment, an exchanger 14 allows cooling a portion 7 of the hot gas generated by the clinker cooler 5 so as to feed said clinker cooler 5 with cooling gas.

We shall now describe the performances of a state-of-the-art plant then those expected with the plant previously described and illustrated on FIG. 1, and finally those of the plant described previously and illustrated on FIG. 2.

The plant in question, as known in the art, is a midsize clinker production unit, representative of the capacity of a large number of existing units and which produces 5,000 tons clinker per day out of an output of 337 ton/hour of raw matter, without implementing the invention.

Such a plant consumes 3,000 MJ/ton of produced clinker, supplied in the form of fuel among which 62.8% are injected at the level of the precalcination reactor. Let us consider the case where fuel is oil coke, having a calorific power lower than 34,300 kJ/kg and a 2%-nitrogen content.

The clinker cooler generates among others 117,000 Nm3/h tertiary air at 890° C., which feeds the combustion of the precalcination reactor, and 210,000 Nm3/h exhaust air at 245° C. (excess air). The flue gases from the cyclone preheater have a flow rate of 286,200 Nm3/h and a temperature of 320° C. The mass flowrate ratio between the fed matter and the flue gases of the preheater is 0.82.

The composition of the generated flue gases, leaving the preheater is as follows:
oxygen: 3.6%
water: 7.1%
carbon dioxide: 29.6%
nitrogen: 59.7%.

The flue gases from the rotary furnace have a flow rate of 86,200 Nm3/h and a temperature of 1,160° C. They are used in the cyclone preheater. The composition of the flue gases generated in the furnace is as follows:
oxygen: 3.2%
water: 5.9%
carbon dioxide: 21.5%
nitrogen: 69.4%.

Seen in this light, 78.1% of the total amount of carbon dioxide are generated in the preheater and only 21.9% in the rotary furnace.

Example 1 according to the invention:

The plant considered is comparable to the state in the art, but this time the concentration of carbon dioxide is called upon, according to the invention illustrated on FIG. 1.

Fuel is fed in the precalcination reactor, that is to say 1,972 MJ per ton of generated clinker. Whereas the operation of the furnace is not modified, with a consumption of 1,117 MJ/t clinker. The oxygen needs for the combustion in the precalcinator are 27.650 Nm3/h.

Thus, 274,100 Nm3/h flue gases are generated at 325° C. at the exit of the preheater among which 104,200 Nm3/h are recycled and 169,900 Nm3/h are extracted for treating the CO2. The mass flowrate ratio between the fed matter and the flue gases of the preheater is 0.79.

The composition of these generated flue gases, leaving the preheater is as follows:
oxygen: 4.2%
water: 10.7%
carbon dioxide: 49.8%
nitrogen: 35.3%
CO2 on dry flue gases: 55.8%.

117,000 Nm3/h tertiary air are extracted at 890° C., which are conducted through an exchanger and transfer their energy to the recycled flue gases from the preheater; whereas the tertiary air is cooling down to 350° C. Said flue gases from the preheater are thereby brought to the temperature of 810° C. before being inserted in the precalcination reactor.

Example 2 according to the invention:

The plant considered is that of the example illustrated on FIG. 2.

The clinker production unit consumes 3,000 MJ/ton of produced clinker, supplied in the form of fuel among which 62.8% are injected at the level of the precalcination reactor. The oxygen needs for the combustion are provided for by pure oxygen, both at the precalcination reactor and at the furnace. The total oxygen needs are 42,060 Nm3/h.

Thus, 238,600 Nm3/h flue gases are generated at 320° C. at the exit of the preheater among which 129,600 Nm3/h are recycled and 109,000 Nm3/h are extracted for treating the CO2. The mass flowrate ratio between the fed matter and the flue gases of the preheater is 0.81.

The composition of these generated flue gases, leaving the preheater is as follows:
oxygen: 6.5%
water: 15.6%
carbon dioxide: 77.7%
nitrogen: 0.22%
CO2 on dry flue gases: 92.0%.

The extracted flue gases correspond to a 166.36 t/h flow rate of carbon dioxide.

The recycled flue gases are conducted through a set of exchangers for being cooled down to 135° C. before use for blowing in the clinker cooler. Excess gases from the cooler, so-called exhaust flux, are also cooled down to 135° C. before being themselves returned towards the clinker cooler.

Thus, a gas flow rate of 275,800 Nm3/h at 135° C. is blown through the cooler. The gas heats up in contact with the matter and three portions can be differentiated, a portion of 48,100 Nm3/h at 1,180° C., so-called secondary flux, which is directed towards the combustion zone of the furnace, a portion of 81,500 Nm3/h at 890° C., so-called tertiary flux, directed separately towards the precalcination reactor, and finally a portion of 146,200 Nm3/h at 370° C., so-called exhaust flux or excess flux. The flow rate of recycled gas in the furnace and the preheater, that is to say the sum of the first two fluxes, is 129.600 Nm3/h. The clinker is the cooler down to a temperature of 205° C.

Naturally, other embodiments could have been contemplated by the man of the art without departing from the framework of the invention defined by the claims below.

We claim:

1. A process for manufacturing cement clinker in a plant comprising:
   a cyclone preheater for preheating raw matter;
   a precalcination reactor, fitted with one or more burners for bringing hot gas to the cyclone preheater;
   a rotary furnace, fitted with a burner fed with fuel, wherein the flue gases from said furnace are directed to the precalcination reactor and/or the cyclone preheater; and
   a clinker cooler with blown-air cooling, at the exit from aid rotary furnace, generating hot gas, wherein a portion of the hot gas generated in said clinker cooler is directed to the rotary furnace;
   the process comprising:
   preheating and decarbonating raw matter in said cyclone preheater and/or said precalcination reactor;
   cooling the clinker coming out of the furnace in said clinker cooler;
   feeding the precalcination reactor with an oxygen-rich gas whose nitrogen content is lower than 30%, forming a sole oxygen source of said reactor; and
   recycling a portion of the hot gases from said cyclone preheater towards one of said precalcination reactor, the cyclone preheater, and the clinker cooler, so as to obtain an adequate flux necessary for suspending matter in said preheater, while adapting another portion of the hot gases, being rich in carbon dioxide, for a treatment for limiting the amount of carbon dioxide discharged into the atmosphere.

2. The process according to claim 1, wherein said portion of the gases leaving said cyclone preheater is recycled so as to obtain a mass flowrate ratio between the treated matter and flue gases ranging from 0.5 kg/kg to 2 kg/kg.

3. The process according to claim 1, wherein the portion of the gases leaving said cyclone preheater is recycled and reheated before being conveyed directly to the precalcination reactor or the cyclone preheater.

4. The process according to claim 3 wherein the portion of the recycled gases is reheated in an exchanger due to a portion of the hot gas generated by the clinker cooler.

5. The process according to claim 1, wherein said oxygen-rich gas has a nitrogen content lower than 5%.

6. The process according to claim 1, wherein the residual heat contained in the portion of gases rich in carbon dioxide is used for the production of energy.

7. The process according to claim 1, wherein said portion of gases rich in carbon dioxide is used as a pneumatic transport fluid for the solid fuels and/or pulverisation fuels for the liquid fuels, and/or as a pneumatic cleaning fluid of the cyclone preheater and/or of the clinker cooler.

8. The process according to claim 1, wherein said portion of gases rich in carbon dioxide adapted for treatment for limiting the amount of carbon dioxide discharged into the atmosphere undergoes a sequestration treatment.

9. A process for manufacturing cement clinker in a plant comprising:
   a cyclone preheater for preheating raw matter;
   a precalcination reactor, fitted with one or more burners for bringing hot gases to the cyclone preheater;
   a rotary furnace, fitted with a burner fed with fuel, wherein the flue gases from said furnace are directed to the precalcination reactor and/or the cyclone preheater; and
   a clinker cooler with blown-air cooling, at the exit from said rotary furnace, generating hot gas, and wherein a first portion of the hot gas generated in the clinker cooler is directed towards the rotary furnace and a second portion of the hot gas generated in the clinker cooler is directed separately from the first portion towards the precalcination reactor;
   the process comprising:
   preheating and decarbonating raw matter in said cyclone preheater and/or said precalcination reactor;
   clinker coming out of the furnace is cooled in said clinker cooler;
   feeding the precalcination reactor with an oxygen-rich gas whose nitrogen content is lower than 30%, forming a sole oxygen source of said reactor;
   recycling a portion of gases from said cyclone preheater to the clinker cooler, so as to obtain an adequate flux necessary for suspending matter in said preheater, while adapting another portion of gases, being rich in carbon dioxide, for a treatment for limiting the amount of carbon dioxide discharged into the atmosphere; and
   feeding the burner of the rotary furnace with an oxygen rich gas whose nitrogen content is lower than 30%, making up a sole oxygen source of the furnace,
   wherein the portion of the gases leaving the preheater that is recycled then cooled due to at least one exchanger and directed to said clinker cooler to act as a cooling gas.

10. The process according to claim 9, in which a raw matter drying unit is used as an exchanger for cooling the portion of the recycled gases.

11. The process according to claim 9, wherein a third portion of the gases generated by the clinker cooler is recycled, which is then cooled through an exchanger for feeding said cooler with cooling gas.

12. The process according to claim 6, wherein said portion of gases rich in carbon dioxide that is adapted for the purpose of a treatment for limiting the amount of carbon dioxide discharged into the atmosphere undergoes a sequestration treatment.

* * * * *